United States Patent
Kanevsky et al.

(10) Patent No.: US 6,496,949 B1
(45) Date of Patent: Dec. 17, 2002

(54) EMERGENCY BACKUP SYSTEM, METHOD AND PROGRAM PRODUCT THEREFOR

(75) Inventors: Dimitri Kanevsky, Ossining, NY (US); Wlodek Zadrozny, Tarrytown, NY (US); Alexander Zlatsin, Yorktown Heights, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/369,783

(22) Filed: Aug. 6, 1999

(51) Int. Cl.[7] ................................................ H02H 3/05
(52) U.S. Cl. ............................... 714/47; 714/13; 714/4; 340/3.3
(58) Field of Search ................................ 714/4, 13, 47; 340/3.1, 3.3, 3.31, 3.32; 700/82; 707/10, 204; 711/162

(56) References Cited

U.S. PATENT DOCUMENTS

| | | | | |
|---|---|---|---|---|
| 4,514,729 A | * | 4/1985 | Szarka | 340/3.32 |
| 5,748,084 A | * | 5/1998 | Isikoff | 340/5.74 |
| 5,889,935 A | * | 3/1999 | Ofek et al. | 709/217 |
| 6,049,578 A | * | 4/2000 | Senechal et al. | 376/215 |
| 6,049,874 A | * | 4/2000 | McClain et al. | 707/204 |

OTHER PUBLICATIONS

"Remote Environmental Monitor for Unattended Computer Operations". IBM Technical Disclosure Bulletin:vol. No. 32, Issue No. 9A, p. 264–266.*

* cited by examiner

Primary Examiner—Robert Beausoleil
Assistant Examiner—Yolanda L. Wilson
(74) Attorney, Agent, or Firm—Charles W. Peterson, Jr.; Louis J. Percello (57) ABSTRACT

An emergency backup system, method and computer program product for backing up data on one or more computers located in an identified danger zone. When an emergency occurs, computers in the danger zone are connected to a network. The computers may be distributed at various remote locations. The protected locations each include a sensor for sensing an emergency situation and signaling the local computer of an impending emergency. The sensor also signals remote computers of the occurrence of the emergency. The computers may have been connected together over a network or, upon receiving an emergency signal, may connect together into a backup network. Local computers in the danger zone are connected across the network to remote computers with sufficient available storage to backup data from a connected local computer. The backup may be a full backup, a partial backup or a selective backup. The computers may include PCs, PDAs and servers. The network may be a LAN, a wireless network, a phone network or a WAN.

28 Claims, 4 Drawing Sheets

EMERGENCY BACKUP SYSTEM, METHOD AND PROGRAM PRODUCT THEREFOR

BACKGROUND OF THE INVENTION

1. Field of the Invention

The present invention is related to disaster recovery and, more particularly, to disaster recovery for computer systems and methods therefor.

2. Background Description

During an emergency information stored, maintained or in use on a computer may be lost. Such information may be the result of days or even weeks of work and, therefore, may be very valuable. So, surge protectors are used to protect computers from a power surge. An emergency universal power supply (UPS) may be used to avoid losing data during a power failure. An UPS provides sufficient power to keep the system running after a power failure long enough to store data in nonvolatile storage located in the computer system and, then, conduct an orderly shut down. After the power failure, the data may be recovered, reloaded onto the computer and the computer may resume operation, where it left off prior to the power failure.

However, if an emergency arises that is more severe than a power failure, such as a fire, even the data normally stored in the computer's nonvolatile storage may be lost, permanently. If the data is lost completely, it must be regenerated to recover from the emergency. Typically, regenerating the data may require redoing previously done work and so, regenerating the data may take as long as it took to generate it initially and at nearly the same cost.

Accordingly, there is a need for disaster recovery for computer systems.

SUMMARY OF THE INVENTION

It is a purpose of the invention to improve computer system disaster recovery.

The present invention is an emergency backup system, method and computer program product for backing up data on one or more computers located in a danger zone. When an emergency occurs, the computers in the danger zone are connected to a backup network The computers may be distributed at various remote locations. Protected locations are locations that include a sensor for sensing an emergency situation and signaling local computers of the pending emergency. The sensor also signals remote computers of the emergency. The computers may have been connected together over a network or, upon receiving an emergency signal, may connect together into a backup network. Local computers in the danger zone are connected across the network to remote computers that have sufficient available storage to backup data from the connected local computers. The backup may be a full backup, a partial backup or a selective backup. The computers may include PCs, PDAs and servers. The network may be a LAN, a wireless network, a phone network or a WAN.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
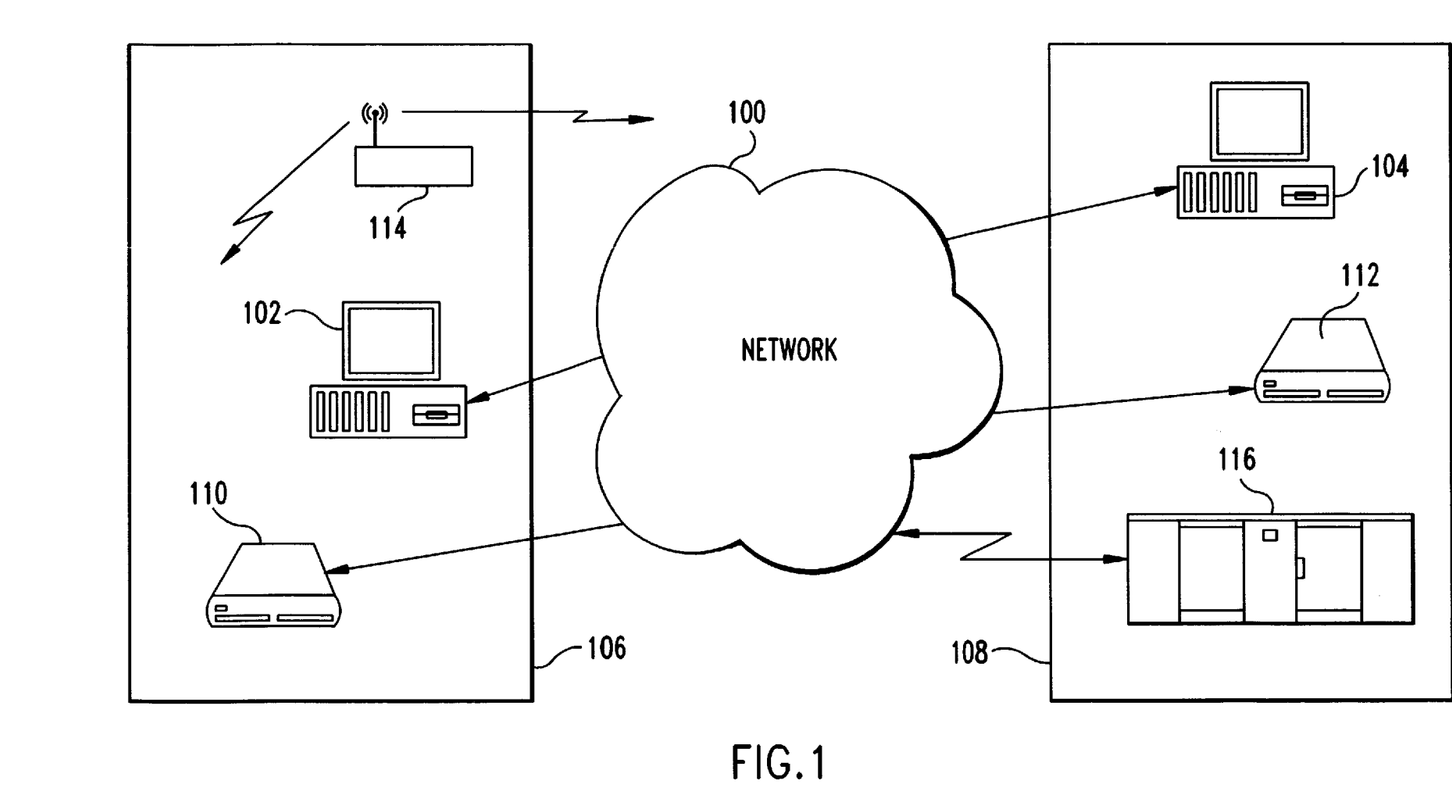
FIG. 1 shows a computer network wherein upon occurrence of an emergency condition, e.g. a fire or earthquake, computers within the zone of danger initiate backup of vulnerable data.

Referring now to the drawings and, more particularly, FIG. 1 shows a computer network 100 wherein upon occurrence of an emergency condition, e.g. a fire or earthquake, computers within the zone of danger initiate backup of vulnerable data. The network 100 may be, for example only, a local area network (LA, a wireless network, a phone network or a wide area network (WAN). The network 100 includes multiple connected computers 102, 104, 116 distributed, for example, in different rooms, 106, 108 or in different buildings. The computers 102, 104, 116 may include, for example, one or more servers 116 and one or more personal computers 102, 104. The network 100 may also include connected hand held computers 110, 112 such as those commonly referred to as personal digital assistants (PDAs). A remote sensor 114 is located in at least one room 106 to sense and signal the occurrence of an emergency condition, e.g. a fire or earthquake. A server 116 may also be connected to the network 100 for additional back up resources and to maintain a disaster center database that includes disaster response models. A disaster response model is a model of a disaster or of a prior emergency situation paired with a preselected response for such an anticipated disaster.

Upon sensing an emergency, the sensor 114 sends a signal to vulnerable computers 102, 110 in the danger zone, room 106 in this example. The signal is further transmitted either directly or indirectly to computers 104, 112 and server 116 in safe areas outside of the danger zone. If the transmission is direct, the signal is transmitted to receivers in the remote computers 104, 112. If the transmission is indirect, then the signal is transmitted by computers 102, 110 over the network 100 to the remote computers 104, 112.

Upon receiving the signal, each endangered computer 102, 110 initiates a backup process, to backup data stored, for example, in files or databases in the computers 102, 110. The type of backup done in an emergency is pre-selected by the system administrator or owner. Accordingly, the backup may be, for example, a full backup wherein all data, e.g., the entire database, is backed up, a partial backup wherein only previously identified data or data changed since the last backup is backed up, or a selective backup wherein previously selected data is backed up.

The emergency sensor 114 may be, for example, a fire detector, an earthquake detector, a water sensor, an air pressure sensor, a pressure sensor, a smell sensor, a heat detector or sensor. The emergency signal sent by the sensor may be an audio signal, a radio signal or, an electrical signal sent over an electrical line connected from the sensor 114 to the computer 102. Further, if audio signal, such as a fire alarm, an earthquake alarm, a flood alarm or a volcano alarm, are employed the computers 102, 110 are equipped to recognize the audible alarm.

Figure 2:
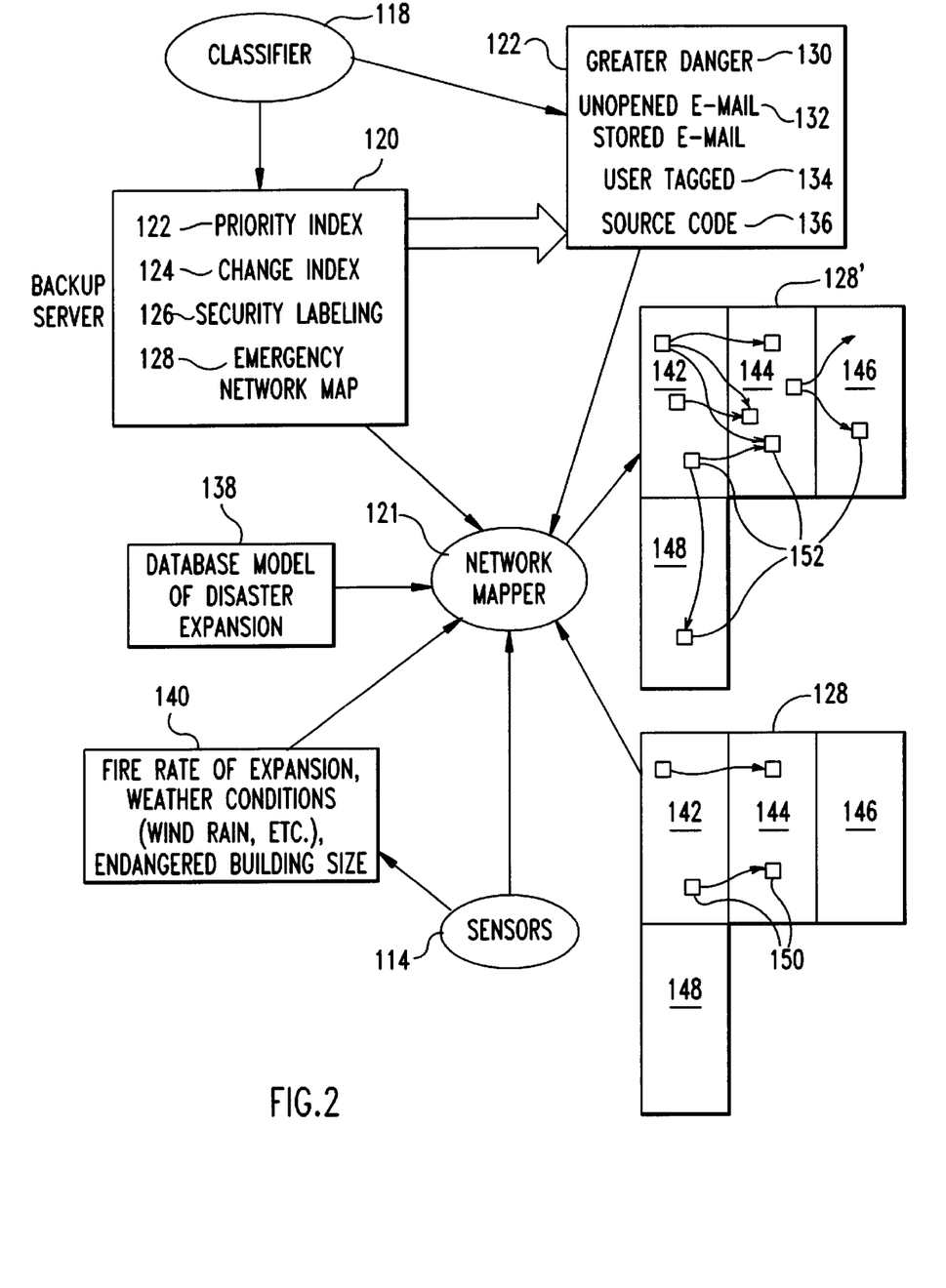
FIG. 2 represents an example of the preferred database structure.

FIG. 2 shows an example of the organization of one of the intended backup computers, e.g., server 116, which includes a classifier module 118 that generates a database 120 having the preferred structure. Upon a sensor 114 sensing an emergency situation, information in the database 120 is passed to a network mapper 121 in server 116 to direct formation of an emergency backup network 100. In this example, the classifier module 118, which is linked to other network databases (not shown), creates a database structure 120 that includes a priority index 122, a change index 124, security labeling 126 and an emergency network map 128.

It should be noted that two types of backup services may be employed for the preferred embodiment system. First, a global backup service may employ the server 116 to provide backup coverage of multiple connected computers, e.g., 102, 110. Additionally, some of the computers 102, 110 may include a local backup service. Each local backup service, which may be included on some or all local computers or embedded devices, is structured like the service structure of FIG. 2, but provides coverage only for local data located on the same local computer, instead of providing emergency backup for all computers in the danger zone. For a system with a local backup service, emergency network map 128 points only to potential connections between the local computer and other computers that might serve as backup computers, where the locally backed up data may be sent.

Accordingly, such local emergency backup services require that the computer upon which the local service resides have sufficient memory to handle the backup and sufficient storage available to backup tie data. This local backup service has some advantages over a direct link to a global backup server because, during an emergency backup, network contact with an outside global backup server may be lost, which could disrupt the emergency global backup. A computer including such a local backup scheme is configured similar to FIG. 2. Therefore, no additional description is required.

Returning to FIG. 2, the priority index 122 of database 120 has a structure that may include, for example, a list 130 of sensitive data that is most likely to be lost; unopened e-mail 132, as well as previously opened but retained e-mail; data 134 that has been previously identified by a user for backup; and source code 136 that may be compiled to regenerate object code. Accordingly, as data is prioritized for backup queries, that prioritization reflects the importance of data and changes in data from previous backups.

The change index 124 lists any data that has changed since an immediately prior backup that are to be backed up in any emergency backup. Thus, the change index 124 allows a system administrator or the user responsible for maintaining the emergency backup process to minimize the amount of critical data that must be handled during an emergency situation. Accordingly, for other types of backups the change index 124 may be omitted.

The classifier module 118 creates and maintains the database structure 120. So, periodically, the classifier module 118 checks for sensitivity marks, e.g., confidential, in preselected locations of a selected number of files maintained on the system. The marks may be located, for example, in a document header or at the end of the document. If the classifier module 118 finds such mark, it marks a file as sensitive. The classifier module also is able to identify files falling in other priority index 122 categories such as unopened e-mail and marks those files accordingly.

The security labeling 126 allows sensitive or proprietary data to be identified and handled appropriately. If sensitive information is included, then, preferably, if time allows the sensitive data is encrypted prior to backup. Accordingly, in an emergency situation, the time required to encrypt the data is estimated and, if sufficient time is deemed available prior to the impending disaster, the sensitive data is encrypted and the encrypted data is backed up. If it is determined that sufficient time is not available, then, depending upon the data sensitivity and cost of recovery, its destruction may be allowed or, it may be transferred unencrypted. It should also be noted that, if sufficient time is available, data may be compressed to reduce emergency backup transfer time.

Optionally, the classifier module 118 may be configured to determine whether stored data contains image data as well as text. Thus, since image data is typically more voluminous than textual data and so, requires a higher transmission and storage capacity, the classifier module may assign the text a higher priority than the image data. By prioritizing the data such that the backup protects the textual data first, the likelihood of backing up all of the textual data is increased, where otherwise, the backup could be interrupted during transmission of the first image, frustrating protection even of that first image.

Further, the classifier module 118 may be configured to identify local backup copies that may be discarded and, so, are not transmitted. For example, word processors automatically make backup copies that need not be preserved to maintain an adequate system snapshot. Further, backup copies of graphics or image are often maintained elsewhere, automatically. Thus, the classifier module 118, preferably, places a lower priority for backing up timed backup copies, first sending the original text or graphic files.

Each preferred embodiment emergency network includes a database model of anticipated disasters 138, preferably, in the backup server. The database model 138 receives various environmental disaster-related parameters 140, e.g. from the sensors 114. For example, for a fire in building 106, these parameters 140 may indicate the rate of expansion of the fire, general weather conditions (whether it is windy, rainy, etc.) and the size of the disaster area or of building 106.

Finally, an initial emergency network map 128 is included that may be based, initially, upon a prior emergency or a response to an anticipated emergency. For example, the initial emergency network map 128 may be a representation of a network in four adjacent rooms 142, 144, 146 and 148. In the initial emergency backup network map 128 connected computers 150 are located in rooms 142 and 144 with network connections represented by arrows. The network mapper, upon receiving the database model 138, environmental parameters 140 and updated sensor 114 information uses the information to modify the initial emergency network map 128 reconnecting computers 152 to form the backup network of updated emergency network map 128'.

So, in the updated emergency backup network map 128' arrows represent data flow within the network during an emergency backup initiated for room 142. The emergency backup network may be, for example, a local area network, a telephone network, a radio network, a wireless network or a combination thereof. Further, the backup may be made over what is commonly referred to as the internet or over an intranet or an extranet.

Additionally, the emergency backup map 128' may include a schedule for selecting which devices are to be connected to which channels, what the capacities of each channel should be, protocol for copying data in accordance with previously established priorities and to what devices the data should be copied. Further, the channels are created on the fly, individually, by devices in the process of communicating with other devices during the emergency. The protocol governing the creation of the backup channels may include device priority, relative danger of data loss, and similarity of memory capacity.

The newly connected computers 152 may include, for example, one or more of each of what is commonly referred to as a personal computer (PC), a server, a mainframe, an embedded device or processor, a PDA, a web phone, a smart wallet, a digital pen or a digital camera. Small embedded devices with relatively little local memory that are connected to the network such as, for example, a smart telephone or a digital watch, depend exclusively on the global backup service from the server 116 for emergency backup. Further, for these small embedded devices the server providing the global backup service may be one or more local computers located in a close proximity to embedded devices. During an emergency, data is transferred from the embedded devices to the local computer and, then, from the local computer, the data is backed up, either locally or globally across a backup network.

It is not intended to restrict the backup network to a collection of computers 152 operating normally as networked computers such as the network 100 shown in the example of FIG. 1. Instead, preferably, the computers are dynamically connectable to a backup network wherein computers 152 within the danger zone 142 are connected to a computer or computers 152 outside of the danger zone 142 or in a safe zone. These other computers 152 may be located in locations 144, 146, 148 at which no emergency signals are detected, at a central remote backup server, or at a previously identified a temporary, remote backup server. Further, when emergency situation is recognized and the preferred backup process is initiated, computers having sufficient storage to store endangered data are identified outside of the danger zone 142 in a safe zone.

Figure 3:
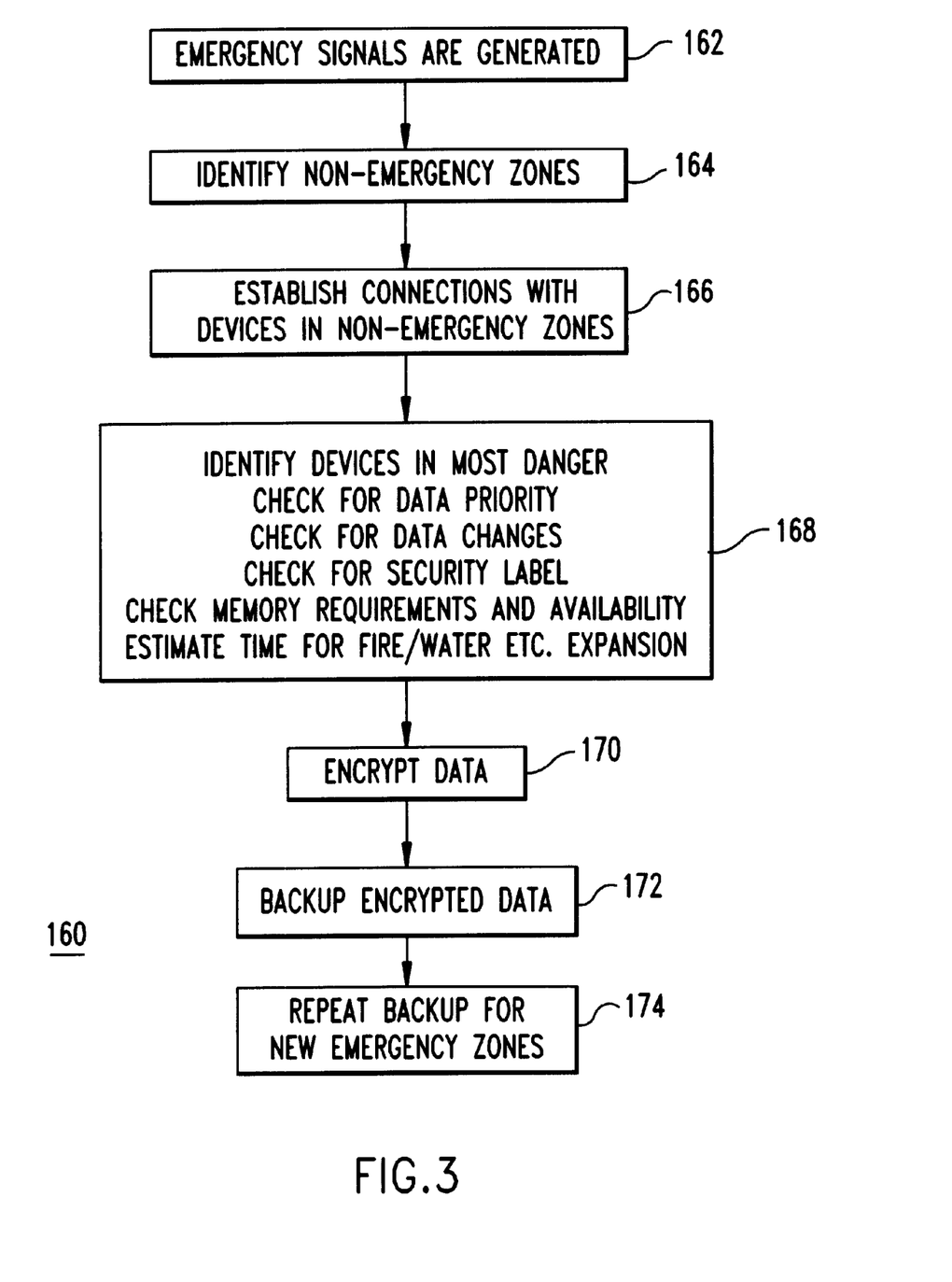
FIG. 3 is a flow diagram of the preferred embodiment emergency backup process.

Thus, FIG. 3 is a flow diagram of the preferred embodiment emergency backup process 160. First, in step 162, after sensing an emergency situation, sensors 114 generate emergency signals. Areas 142 within a previously identified distance from the alarms are identified as being emergency zones, with remaining areas 144, 146, 148 being non-emergency zones and identified as such in step 164. Preferably, each individual computer system 152 maintains its own map or list of connectable systems. From this map 128 the emergency back up network 128' is created, dynamically. Preferably, each system 152, also includes responses to various environmental parameters 140 and disaster types such that the system may respond appropriately based upon the type and severity of the danger.

The actual system response depends upon the type of emergency alarm received. An earthquake causes the backup network to include computers in other cities or states. A flash flood or other water hazard causes the backup network to include systems on higher floors of the same building to be included. A fire in one room causes the first backup network 128' to include systems in another room. If the fire spreads to that room, the situation is reassessed and the backup network expands, dynamically, to include other buildings. Thus, in step 166, each device 110 or system 102 in an identified emergency location 106 attempts to establish connection with devices 112 or systems 104 in non-emergency locations 108.

Preferably, in step 168, priority is assigned according to the previously established device priority stored in the priority index 122 of the database 120 and, then, the data is transferred for backup according to that established priority. A preliminary estimate is made regarding the amount of data to be sent and the availability of storage at non-emergency locations. Also, the time available for transfer is estimated, depending upon any available information about the characteristics of the emergency. Further, if possible, data in those devices identified as being in the greatest danger are passed to devices 104, 112 in non-emergency locations 108 first. Then, data not previously backed up or recently changed data, since the previous backup for example, are passed from devices 102, 110 in emergency locations 106 to devices 104, 112 in non-emergency locations 108.

Then, in step 170, secured data is encrypted prior to backup and in step 172, the encrypted data is backed up. Finally, since in any emergency situation such as a fire, the danger may spread beyond the initial danger zone, the emergency area is checked to determine whether the danger zone has spread. In step 174, if the emergency has spread, devices in newly endangered locations are backed up. These new locations may include devices that had previously received backup data from other, initially endangered devices. Further, during this additional backup, these newly endangered devices also start to organize other more remote devices on the backup network or devices in a central service outside of the immediate emergency area.

Figure 4:
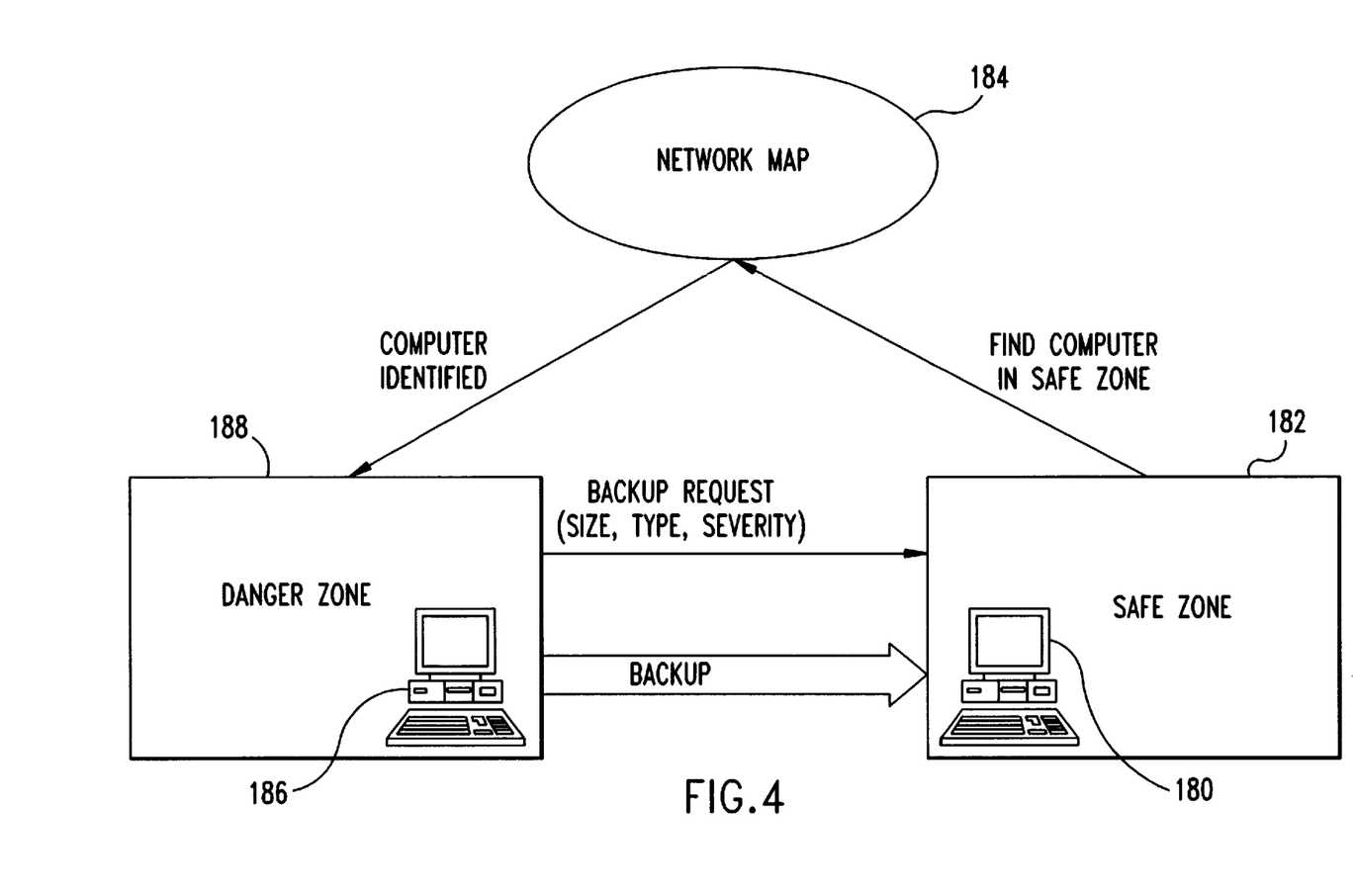
FIG. 4 is another embodiment wherein, computers in the safe zone can override the receiving points defined in the emergency backup map.

Optionally, as represented in FIG. 4, computers 180 in the safe zone 182 may override the receiving points defined in the emergency backup map 184, electing to receive backup data from computers 186 in the danger zone 188. Accordingly, when emergency backup network computers 180 in the safe zones 182 receive a backup request from one or more endangered computers 186, the computers 180 in the safe zone 182 share the request and any corresponding information, e.g., the amount and type of data to be backed up as well as the severity of the emergency situation. At that point, the computer (not shown) identified in the emergency network map 184 may begin to receive the backup data or, another computer in safe zone 182, more suited to the amount and type of data being transferred or the speed of the transfer may be substituted. As the data is transferred, it may be forwarded to a global backup server (not shown) or to some other computer on the backup network, to make space on the receiving computer in safe zone 182, if necessary.

While the invention has been described in terms of preferred embodiments, those skilled in the art will recognize that the invention can be practiced with modification within the spirit and scope of the appended claims.

We claim:

1. An emergency backup system for backing up data on one or more computers located in an identified danger zone, said backup system comprising:
   a network of computers at distributed locations;
   at least one sensor at one or more of said locations coupled to at least one local computer connected to said network, said sensor sensing the occurrence of an emergency and transmitting an emergency signal in response to said sensed emergency; and
   at least one receiver at a remote location coupled to a remote computer connected to said network, said receiver receiving said emergency signal, said remote computer having sufficient available storage to store selected data from said local computer, said local computer transferring data to said remote computer further in response to said emergency signal.

2. An emergency backup system as in claim 1, wherein each said at least one sensor is selected from the group consisting of fire detectors, earthquake detectors, water sensors, air pressure sensors, pressure sensors, smell sensors and heat sensors.

3. An emergency backup system as in claim 1, wherein the transmitted emergency signal is selected from the group consisting of a fire alarm, an earthquake alarm, a flood alarm and a volcano alarm.

4. An emergency backup system as in claim 1, wherein all data stored on said local computer is transferred to said remote computer.

5. An emergency backup system as in claim 1, wherein all data determined to have changed since a last backup is transferred to said remote computer.

6. An emergency backup system as in claim 1, wherein said network is a backup network, said computers being connected together upon receiving said emergency signal to form said backup network.

7. An emergency backup system as in claim 6, wherein said network of computers includes a mainframe computer.

8. An emergency backup system as in claim 6, wherein said network of computers includes a handheld computer.

9. An emergency backup system as in claim 6, wherein said network of computers includes a network server.

10. An emergency backup system as in claim 6 wherein said network of computers includes one or more personal computers.

11. An emergency backup system as in claim 10, wherein at least one of said personal computers includes local storage for backing up data locally on said at least one personal computer in response to said emergency signal.

12. A emergency backup system for backing up data on one or more computers located in an identified danger zone, said backup system comprising:
  means for coupling a plurality of computers together, each of said plurality of computers being located at one of two or more locations;
  sensing means at one or more of said locations coupled to at least one local computer, said sensing means for sensing an emergency and transmitting an emergency signal in response to said sensed emergency;
  receiving means for receiving said emergency signal at a remote location, said receiving means coupled to a remote computer;
  data storage means for storing backup data at said remote computer;
  data selection means for selecting data being stored at said local computer by said data storage means; and
  means for transferring selected data to said remote computer from said local computer in response to said emergency signal.

13. An emergency backup system as in claim 12, wherein the means for coupling the plurality of computers together comprises means for forming a wireless network.

14. An emergency backup system as in claim 12, wherein the means for coupling the plurality of computers together connects the computers together to form a local area network.

15. An emergency backup system as in claim 12, wherein the data selection means comprises prioritization means for prioritizing data for backup.

16. An emergency backup system as in claim 15, wherein the prioritization means prioritizes data according to data sensitivity.

17. An emergency backup system as in claim 15, further comprising:
  means for establishing an emergency data backup protocol.

18. An emergency backup system as in claim 17, wherein the emergency data backup protocol comprises:
  a schedule for device to channel connection;
  a capacity schedule of each connected channel; and
  a destination computer for data being backed up.

19. An emergency backup system as in claim 17, further comprising:
  encryption means for encrypting sensitive data.

20. An emergency backup system as in claim 19, wherein the encryption means includes means for estimating a time to encrypt data.

21. A disaster recovery method comprising the steps of:
  a) transmitting an emergency signal in response to an identified danger;
  b) for each device within an identified danger zone, establishing a connection with at least one other device not within said danger zone;
  c) transferring data from said each device in said identified danger zone to said at least one other device, said data being stored temporarily at said other device for subsequent recovery;
  d) encrypting identified secured data; and
  e) copying said encrypted data.

22. A disaster recovery method as in claim 21, wherein prior to encrypting data, an estimation is made of the time for said encryption.

23. A disaster recovery method as in claim 21, further comprising the step of:
  f) determining if said identified danger extends to locations not previously identified as being in said danger zone and repeating steps a–e for any devices in determined extended danger zone locations.

24. A disaster recovery method as in claim 23, wherein in the step (b) of establishing the connection to a device not in said danger zone, establishes said connection to corresponding devices not in said danger zone responsive to a maximum amount of data to be transferred, a rate of data transfer and the determined likelihood of destruction of data in each of said corresponding devices.

25. A disaster recovery method as in claim 23 wherein, in the step (b) of establishing the connection to a device not in said danger zone, the connected device overrides an initial selection.

26. A computer program product for disaster recovery of data stored locally in one or more computers, having a computer readable medium with computer readable program code stored thereon, said computer readable program code comprising:
  computer readable program code means for transmitting an emergency signal in response to an identified danger;
  computer readable program code means for establishing a connection between each device located in an identified danger zone with at least one other device not within said danger zone;
  computer readable program code means for transferring data from said each device in said identified danger zone to said at least one other device, said data being stored temporarily at said other device for subsequent recovery;
  computer readable program code means for encrypting data identified as being secured data; and
  computer readable program code means for transferring said encrypted data.

27. A computer program product for disaster recovery of claim 26, having a computer readable medium with computer readable program code stored thereon, said computer readable program code further comprising:

computer readable program code means for determining if said identified danger extends to locations not previously identified as being in said danger zone and backing up data for any devices in determined extended danger zone locations.

28. A computer program product for disaster recovery of claim 26, having a computer readable medium with computer readable program code stored thereon, said computer readable program code further comprising:

computer readable program code means for means for establishing the connection between devices establishes said connection from said each device to a corresponding device in said danger zone responsive to a maximum amount of data to be transferred, a rate of data transfer and the determined likelihood of destruction of data in each of said corresponding devices.

* * * * *

UNITED STATES PATENT AND TRADEMARK OFFICE
CERTIFICATE OF CORRECTION

PATENT NO.    : 6,496,949 B1                                             Page 1 of 1
DATED         : December 17, 2002
INVENTOR(S)   : Dimitri Kanevsky et al.

It is certified that error appears in the above-identified patent and that said Letters Patent is hereby corrected as shown below:

Column 3,
Line 28, delete "tie" and insert -- the --.

Column 6,
Line 65, delete "detectors,earthquake" and insert -- detectors, earthquake --.

Signed and Sealed this

Thirteenth Day of May, 2003

JAMES E. ROGAN
*Director of the United States Patent and Trademark Office*